(12) United States Patent
Tanaka et al.

(10) Patent No.: US 9,037,002 B2
(45) Date of Patent: May 19, 2015

(54) PRE-EMPHASIS CONTROL METHOD AND OPTICAL TRANSMISSION SYSTEM

(75) Inventors: Jyunji Tanaka, Kawasaki (JP); Shinichi Kaneko, Kawasaki (JP); Takeo Osaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 13/293,339

(22) Filed: Nov. 10, 2011

(65) Prior Publication Data

US 2012/0121257 A1 May 17, 2012

(30) Foreign Application Priority Data

Nov. 12, 2010 (JP) .................................. 2010-253431

(51) Int. Cl.
- *H04B 10/04* (2006.01)
- *H04B 10/00* (2013.01)
- *H04J 14/02* (2006.01)
- *H04B 10/08* (2006.01)
- *H04B 10/079* (2013.01)

(52) U.S. Cl.
CPC ...... *H04J 14/0221* (2013.01); *H04B 10/07953* (2013.01); *H04B 2210/254* (2013.01)

(58) Field of Classification Search
USPC ........................................................ 398/149
See application file for complete search history.

(56) References Cited

U.S. PATENT DOCUMENTS

| 6,445,471 B1* | 9/2002 | Shimokawa et al. ........... 398/79 |
| 7,308,200 B2* | 12/2007 | Hachiya et al. ................ 398/79 |
| 7,433,599 B2 | 10/2008 | Takahara et al. |
| 8,064,771 B2* | 11/2011 | Mitchell et al. ................. 398/94 |
| 2001/0019436 A1* | 9/2001 | Nakajima et al. ............. 359/110 |
| 2004/0146302 A1* | 7/2004 | Balland et al. ................. 398/94 |
| 2005/0207754 A1* | 9/2005 | Yamaguchi et al. ............ 398/38 |
| 2006/0233552 A1* | 10/2006 | Eder et al. ........................ 398/94 |
| 2008/0037983 A1* | 2/2008 | Ciaramella et al. ............. 398/34 |

FOREIGN PATENT DOCUMENTS

| JP | 2004-7150 A | 1/2004 |
| JP | 2004-96242 A | 3/2004 |
| JP | 2008-507870 A | 3/2008 |

OTHER PUBLICATIONS

Kaminow et al., Optical Fiber Telecommunication IV A, 2002, Elsevier Science, p. 182.*

* cited by examiner

*Primary Examiner* — Ken Vanderpuye
*Assistant Examiner* — Jai Lee
(74) *Attorney, Agent, or Firm* — Fujitsu Patent Center

(57) ABSTRACT

A pre-emphasis control method includes calculating an average value of transmission characteristics based on transmission characteristics of a plurality of light beams received by a receiver, and determining that, among signals of the plurality of light beams, a wavelength with a deviation from the average value is a wavelength at which control is to be performed, determining that the wavelength at which control is to be performed and a wavelength adjacent thereto are a group of wavelengths at which control is to be performed, obtaining an average of transmission characteristics of the group of wavelengths at which control is to be performed, and based on a difference between averaged transmission characteristics and respective transmission characteristics of the group of wavelengths at which control is to be performed, changing a light intensity output from each transmitter that transmits a group of wavelengths at which control is to be performed.

3 Claims, 17 Drawing Sheets

PRE-EMPHASIS CONTROL METHOD AND OPTICAL TRANSMISSION SYSTEM

CROSS-REFERENCE TO RELATED APPLICATIONS

This application is based upon and claims the benefit of priority of the prior Japanese Patent Application No. 2010-253431, filed on Nov. 12, 2010, the entire contents of which are incorporated herein by reference.

FIELD

The embodiment discussed herein relates to a method of controlling a wavelength division multiplexing (WDM) optical transmission apparatus in optical transmission systems. In particular, the embodiment relates to a pre-emphasis control method of controlling the optical transmission power at wavelengths.

BACKGROUND

Optical transmission systems have recently been brought into practical use as communications systems. In particular, WDM optical transmission systems are being widely used in optical communications in order to achieve high-speed, high-capacity communications. In the future, with the increasing capacity and speed of communications lines, it is desirable to develop systems that cope with such increases.

In WDM optical transmission systems, to increase the transmission capacity, realization of a large capacity is sought by 1) increasing the transmission speed, 2) decreasing the wavelength intervals of optical signals, 3) applying a transmission speed adaptable for the capacity of data to be transmitted, and 4) applying a modulation format adaptable for the capacity of data to be transmitted. In order to meet these four elements for increasing the transmission capacity, pre-emphasis control may be performed that results in improvement in transmission characteristics in WDM optical transmission systems. The pre-emphasis control is control that adjusts the optical transmission power of multiplexed signals at each wavelength at the transmitter side to improve transmission characteristics at the receiver side.

In optical transmission systems, optical signals transmitted at the transmitter side need to be properly received at the receiver side; however, factors hampering this proper reception related to the use of optical fibers occur. Examples of the factors include wavelength dispersion and nonlinear effects. To properly receive a signal at the receiver side, the Q value corresponding to the signal-to-noise ratio of the received signal needs to be equal to or greater than a predetermined value. However, wavelength dispersion or nonlinear effects may produce degradation in the received waveform, which causes the Q value to be equal to or less than the predetermined value.

There is a technique in which, when pre-emphasis control is performed, it is determined whether an optical signal at each wavelength is in a nonlinear region or in a linear region, and, based on the determination, the pre-emphasis is performed in order to ensure the Q value. This enables pre-emphasis to be automatically performed in a system that transmits and receives wavelength division multiplexed optical signals and in which multiple wavelength channels are multiplexed.

The pre-emphasis control for improving transmission characteristics in a WDM optical transmission system is currently subject to limitations caused by various factors described below, and thus control is becoming difficult.

a) As the wavelength intervals of optical signals are decreased, cross phase modulation (XPM), a nonlinear phenomenon, occurs on a transmission path, resulting in degradation in transmission characteristics.

b) The light power intensity of signals is high, and therefore self phase modulation (SPM), a nonlinear phenomenon, occurs on a transmission path, resulting in degradation in transmission characteristics. Typically, with an increase in the speed of an optical signal, light intensity increases and marked degradation appears.

c) Further, the variety of modulation methods is increasing. In addition to existing on-off keying (OOK), methods such as return-to-zero differential phase-shift keying (RZ-DPSK) and return-to-zero quadrature-phase-shift-keying (RZ-QPSK) are in practical use. Signals having a wide variety of light-intensity characteristics and wavelength interval characteristics are contained together in one system.

Moreover, the transmission characteristics include parameters, such as the Q value and a bit error rate (BER) after transmission, indicating transmission quality in an optical transmission system, and the transmission distance, the intervals at which optical amplifier repeaters are placed, and characteristics of an optical fiber transmission path are determined in accordance with the characteristics of devices, the maintenance policy, and so on. The bit error rate and the Q value correspond to each other at a ratio of 1 to 1, and therefore the inclusion of a BER/Q value conversion table enables a conversion unit 1001 to convert a BER into the Q value. With these system elements under the same conditions, the transmission quality tends to be degraded as the number of wavelengths increases and the wavelength intervals of optical signals decrease. It is therefore important to adjust the output intensities of optical signals in a certain range in order to ensure the transmission quality.

In conventional optical transmission systems, typically, for optimization of pre-emphasis of the transmission output levels of optical signals, the light output levels at each wavelength are increased or decreased within a certain range, so that transmission characteristics are improved. With such conventional methods, transmission characteristics at each individual wavelength can be improved. However, the marked influence on signals at wavelengths adjacent to the increased or decreased wavelength is apparent for a transmission path with steep nonlinear events. It has been impossible to control the Q values at the receiver side of a plurality of wavelengths such that the Q values are within a predetermined range.

Business related to wavelength addition has recently been increasing. In the case of adding a new wavelength to an old system where a transmission path has been constructed, wavelengths are sometimes added such that the number of the wavelengths exceeds the permissible limits of the transmission path designed at the time of system introduction. In such a case, nonlinear events are likely to occur, and it is necessary to add wavelengths while mitigating the effects on the existing wavelengths in operation. This makes it very difficult to optimize pre-emphasis for a plurality of wavelengths.

In more recent systems, there is a larger variety of modulation formats, the transmission speed at each wavelength has been increased, and wavelength intervals between signals have been decreased. In a conventional pre-emphasis method, degradation in transmission characteristics caused by interference of wavelengths adjacent to each other cannot be taken into consideration. There is a demand for a new control method.

SUMMARY

A pre-emphasis control method in a wavelength division multiplexing optical transmission apparatus including transmitters that transmit a light beam toward an opposing station, a receiver that receives a light beam transmitted from the opposing station, and a processor that is operative to control the transmitters, the pre-emphasis control method includes in a wavelength division multiplexing optical transmission apparatus including transmitters that transmit a light beam toward an opposing station, a receiver that receives a light beam transmitted from the opposing station, and a processor that is operative to control the transmitters, calculating an average value of transmission characteristics based on transmission characteristics of a plurality of light beams received by a receiver, and determining that, among signals of the plurality of light beams, a wavelength with a deviation from the average value is a wavelength at which control is to be performed, determining that the wavelength at which control is to be performed and a wavelength adjacent thereto are a group of wavelengths at which control is to be performed, obtaining an average of transmission characteristics of the group of wavelengths at which control is to be performed, and based on a difference between averaged transmission characteristics and respective transmission characteristics of the group of wavelengths at which control is to be performed, changing a light intensity output from each transmitter that transmits a group of wavelengths at which control is to be performed.

The object and advantages of the disclosed embodiments will be realized and attained by means of the elements and combinations particularly pointed out in the claims.

It is to be understood that both the foregoing general description and the following detailed description are exemplary and explanatory and are not restrictive of the disclosed embodiments, as claimed.

DESCRIPTION OF EMBODIMENTS

An embodiment of the present invention will be described below with reference to the accompanying drawings.

This embodiment controls the power at a wavelength at which control is to be performed and wavelengths adjacent thereto, during control of pre-emphasis of each wavelength, thereby improving the transmission characteristics of the system.

Figure 1:
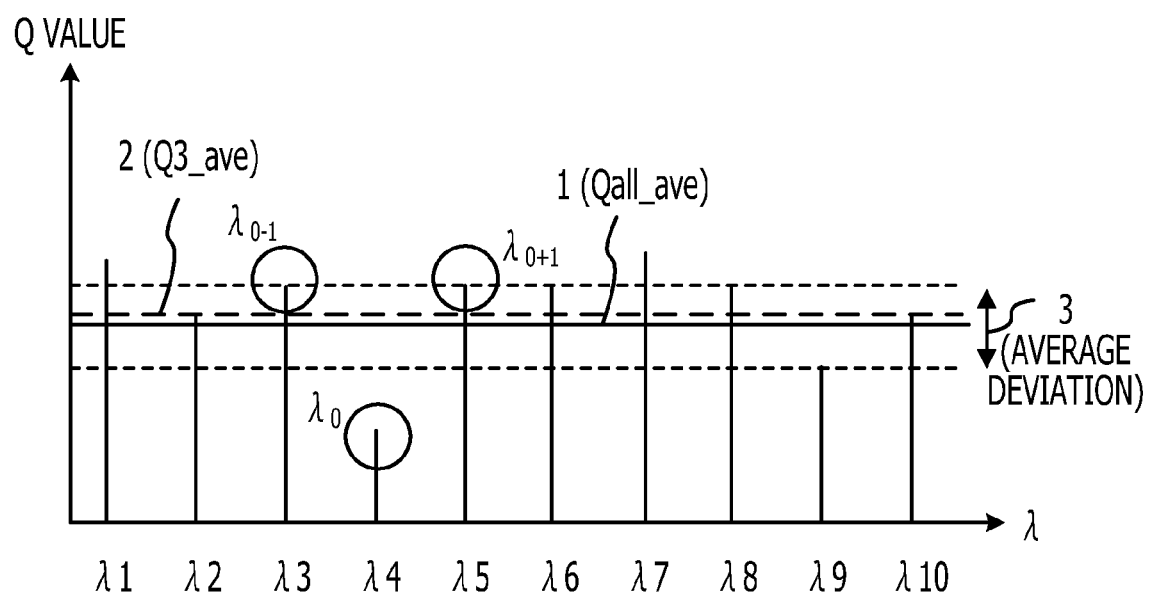
FIG. 1 illustrates an example of an optical spectrum of wavelength division multiplexed light at the receiver side.

FIG. 1 illustrates an example of an optical spectrum of wavelength division multiplexed light at the receiver side. The Q values of wavelengths of from $\lambda 1$ to $\lambda 10$ of the wavelength division multiplexed light are illustrated. The Q value is an index used for quality evaluation of optical transmission and a value quantitatively indicating the influence of noise in the amplitude direction. It can be said that the transmission quality increases with Q value. Further, an average value (Qall_ave) 1 indicating the average of all Q values, an average value (Q3_ave) 2 indicating the average of Q values of three wavelengths, the determined wavelength $\lambda 0$ at which control is to be performed and the adjacent wavelengths $\lambda 0-1$ and $\lambda 0+1$, and an average deviation 3 indicating a deviation from the average value of all the Q values. The power of optical signals is adjusted at the wavelength at which control is to be performed and two or three of the adjacent wavelengths of wavelength division multiplexed optical signals of a wavelength division multiplexing apparatus including forward error correction (FEC) bit error rates in a WDM optical transmission system. A method in which change of the wavelength, at which control is to be performed, and adjustment of the power of optical signals at the wavelength, at which control is to be performed, and two or three of the adjacent wavelengths are repeated so as to minimize the average bit error rate of a plurality of multiplexed optical signals used in the system will be described later.

Figure 2:
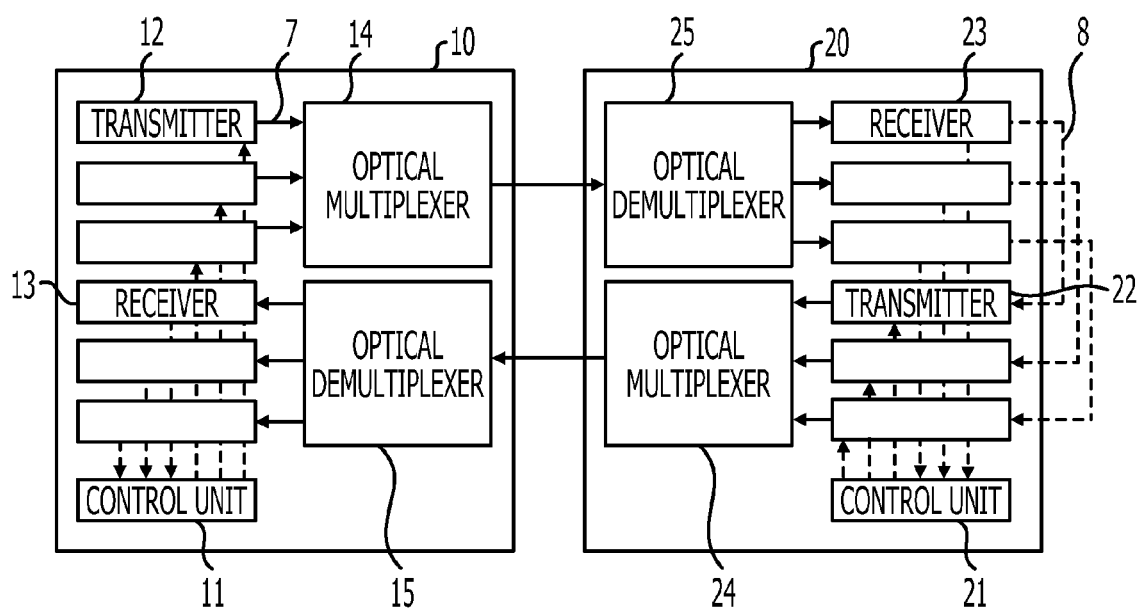
FIG. 2 illustrates an embodiment in the case of performing pre-emphasis control.

An embodiment in the case in which a WDM apparatus on the transmitter side performs pre-emphasis control is illustrated in FIG. 2. When an optical signal of each transmitter 12 is transmitted at a predetermined optical power on the basis of an instruction from a control unit 11 of a WDM apparatus 10, which is an apparatus on the transmitter side, optical signals 7 transmitted from the transmitters 12 are multiplexed in an optical multiplexer 14 and are transmitted to a WDM apparatus 20 serving as the opposing station. The received optical signals are demultiplexed in an optical demultiplexer 25 of the WDM apparatus 20 as the opposing station, and the demultiplexed optical signals are received by receivers 23. The receiver 23 measures bit error rates (or Q values), which are transmission characteristics of optical signals at wavelengths. Transmitters 22 of the WDM apparatus 20 as the opposing station are notified of the results using control signals 8. The transmitters 22 of the opposing station which have been notified of the results insert the notified transmission characteristics in overhead portions of FEC frames used for the optical signals. The transmitters 22 multiplex the optical signals with the transmission characteristics inserted therein using an optical multiplexer 24 and transmit the multiplexed optical signals to the WDM apparatus 10 on the transmitter side.

The transmitted optical signals are demultiplexed in an optical demultiplexer 15 of the transmitter-side WDM apparatus, and the demultiplexed optical signals are received by receivers 13. The control unit 11 of the WDM apparatus 10 on the transmitter side acquires transmission characteristics of the optical signals received in the WDM apparatus 20 as the opposing station. The transmission characteristics are received by the receivers 13. The control unit 11 performs pre-emphasis control on the basis of the transmission characteristics information (information on bit error rates or Q values into which the bit error rates are converted).

Figure 3:
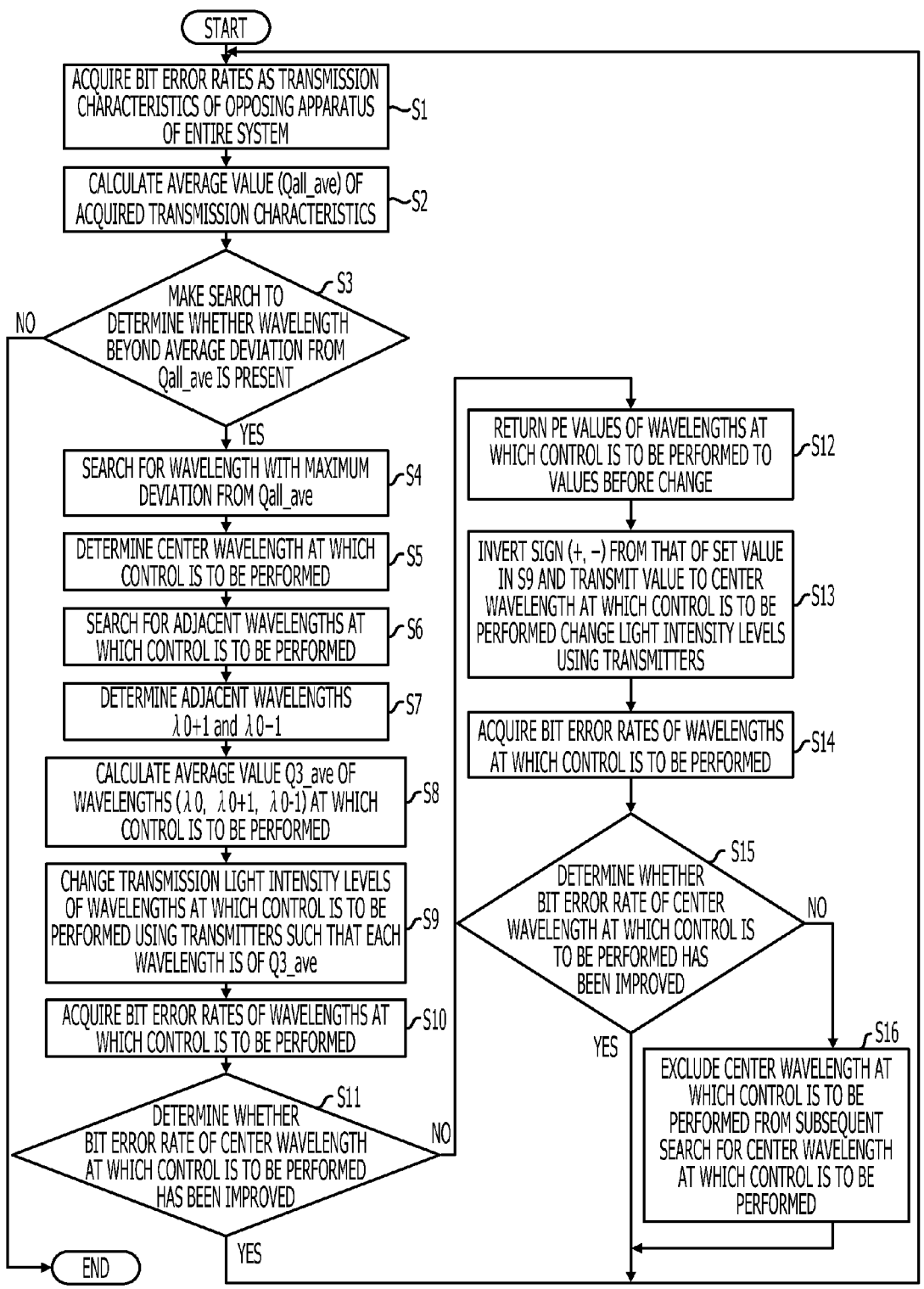
FIG. 3 illustrates a flowchart of pre-emphasis automatic control of controlling three wavelengths.
Figure 4A:
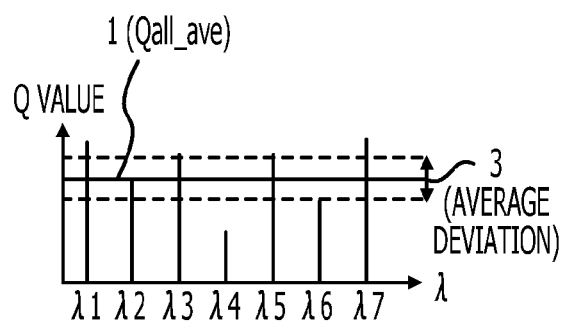
FIGS. 4A to 4D illustrate optical spectra in the case in which the relationship between the PE value and the Q value is linear.
Figure 4B:
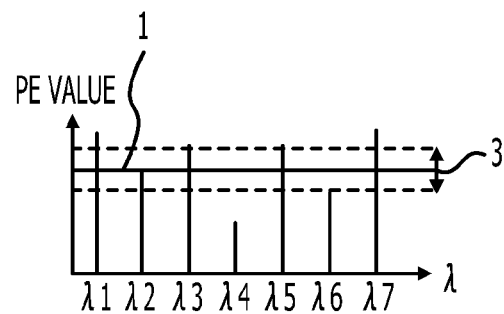
Figure 4C:
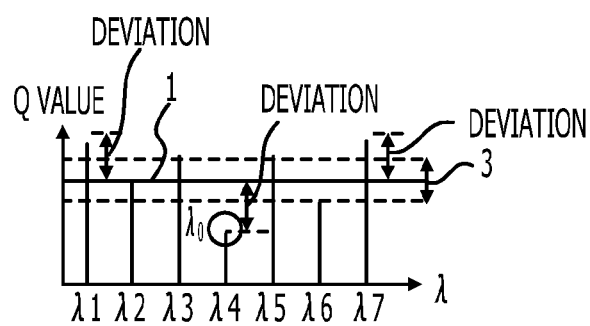
Figure 4D:
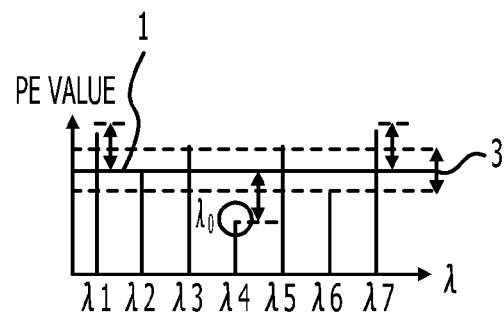
Figure 5A:
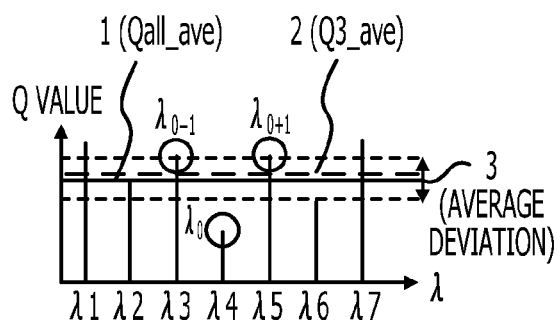
FIGS. 5A to 5D illustrate optical spectra in the case in which the relationship between the PE value and the Q value is linear.
Figure 5B:
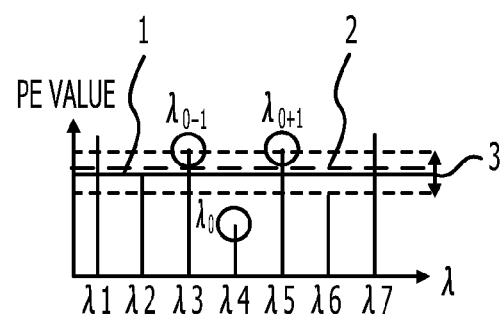
Figure 5C:
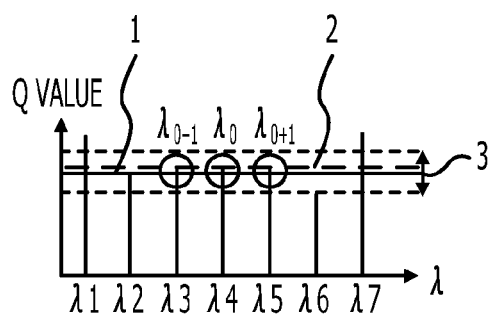
Figure 5D:
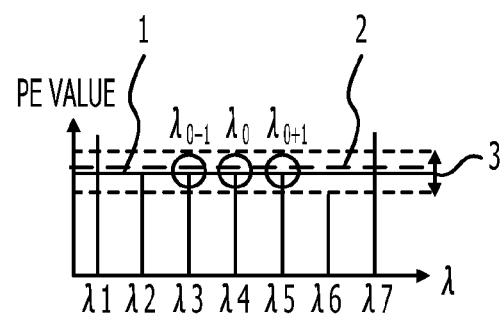
Figure 6A:
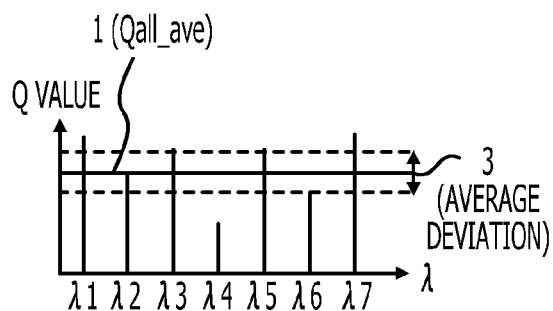
FIGS. 6A to 6F illustrate changes in optical spectrum in the case in which the relationship between the PE value and the Q value is nonlinear.
Figure 6B:
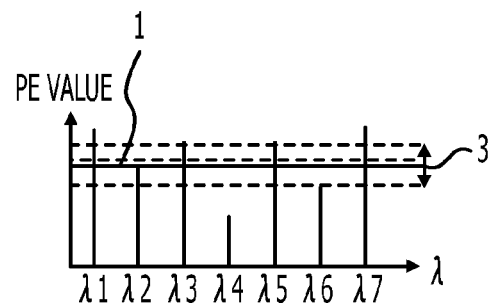
Figure 6C:
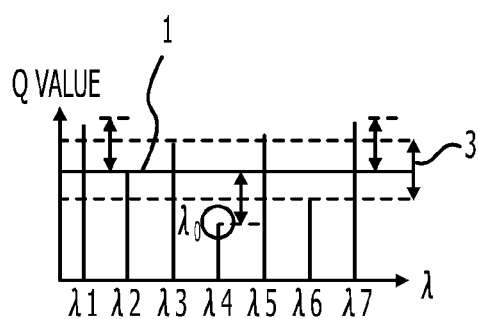
Figure 6D:
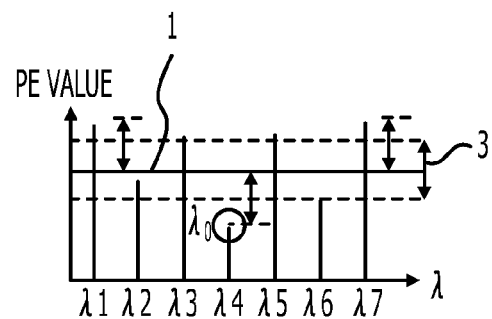
Figure 6E:
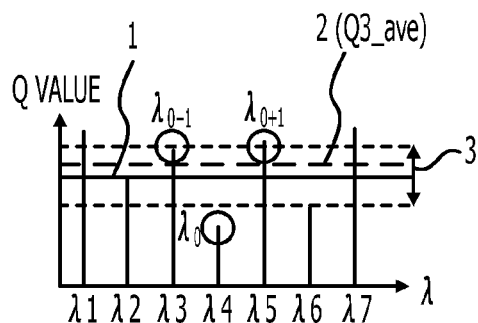
Figure 6F:
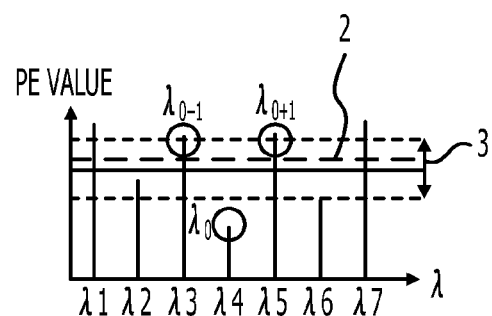
Figure 7G:
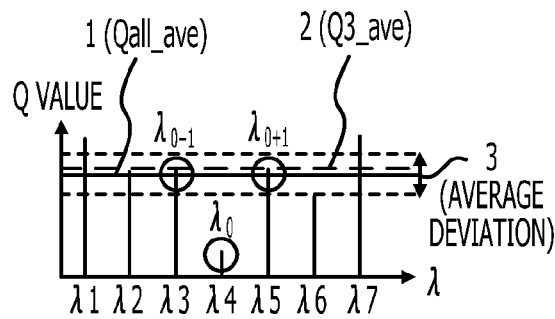
FIGS. 7G to 7L illustrate changes in optical spectrum in the case in which the relationship between the PE value and the Q value is nonlinear.
Figure 7H:
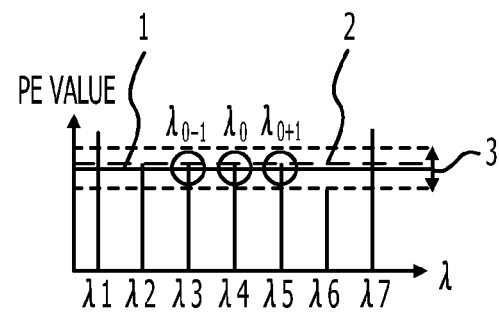
Figure 7I:
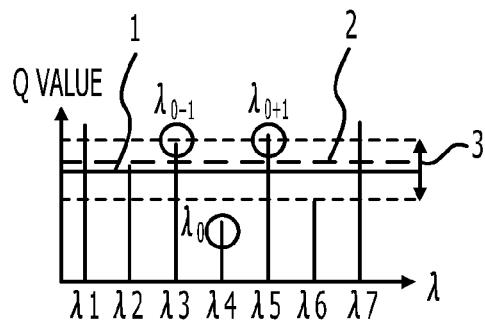
Figure 7J:
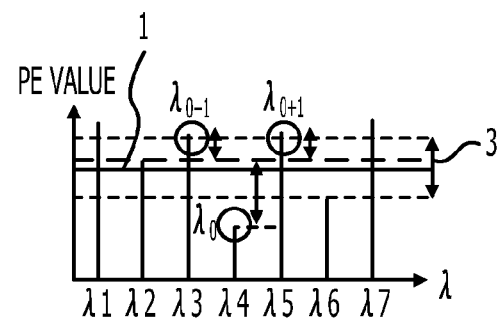
Figure 7K:
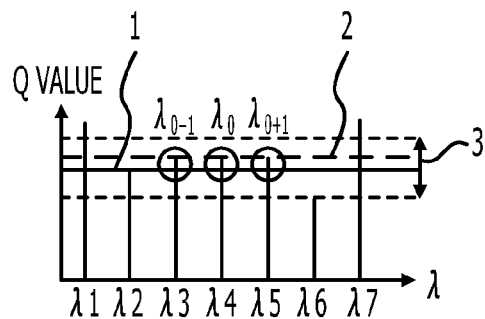
Figure 7L:
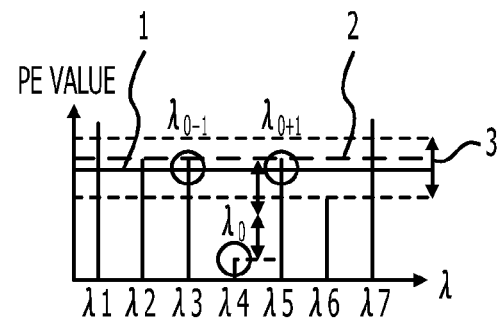

The flowchart of pre-emphasis automatic control of controlling three wavelengths in total, namely, the wavelength at which control is to be performed and both adjacent wavelengths, is illustrated in FIG. 3. During the control, adjustment of the amount of dispersion compensation at the transmitter/receiver side is also included.

As soon as the pre-emphasis automatic control of controlling three wavelengths in total, namely, the wavelength at which control is to be performed and both adjacent wavelengths, begins, the bit error rates (or the numbers of FEC error corrections), which are characteristics after transmission of the system, are acquired by transmitters or receivers (S1). The average value (Qall_ave) 1 of the acquired transmission characteristics is calculated (S2). A search is made to determine whether a wavelength that is outside a region represented by the average deviation 3 from Qall_ave 1 is present (S3). If the wavelength that is outside the region represented by the average deviation 3 from Qall_ave 1 is not present, then the process is terminated.

A search is made for a wavelength with the maximum deviation from Qall_ave 1 (S4), and the found wavelength with the maximum deviation from Qall_ave 1 is determined as a center wavelength (λ0) at which control is to be performed (S5). A search is made for adjacent wavelengths at which control is to be performed, which are adjacent (long wavelength/short wavelength) to and placed at regular intervals from the wavelength λ0 serving as the center (S6). Next the adjacent wavelengths λ0+1 and λ0-1 at which control is to be performed are determined (S7). Then the average value (Q3_ave) 2 of transmission characteristics of three wavelengths λ0, λ0+1, and λ0-1, at which control is to be performed, is calculated (S8). Next, for the three wavelengths, the transmission light intensity level (pre-emphasis: PE) of each wavelength is changed using transmitters such that each wavelength is of Q3_ave 2 (S9). The PE change amounts after change are given such that P'λ0=Q3_ave 2−Pλ0, P'λ0+1=Q3_ave 2−Pλ0+1, and P'λ0−1=Q3_ave 2−Pλ0−1. The bit error rates of three wavelengths at which control is to be performed are reacquired (S10). It is determined whether the reacquired bit error rates have been improved. If the reacquired bit error rates have been improved, then the process returns to S1 (S11).

If the reacquired bit error rates have not been improved, then the PE values of the wavelengths at which control is to be performed are returned to the values before the change (S12) and the following procedure is performed. For the center wavelength at which control is to be performed, the transmission light intensity level whose sign is opposite to that of S9 is set using a transmitter. For the adjacent wavelengths at which control is to be performed, the same value as in S9 is set (S13). The bit error rates of the wavelengths at which control is to be performed are measured (S14). It is determined whether the bit error rate of the center wavelength at which control is to be performed has been improved (S15). If the bit error rate has been improved, then the process goes to S1. If the bit error rate has not been improved, then the PE value is returned to the original PE value and, in the subsequent repeat processing, that center wavelength at which control is to be performed is removed from the conditions of search for a center wavelength at which control is to be performed (S16). The process returns to S1 and is repeated.

When optical signals of the transmitters 12 are transmitted at a predetermined optical power on the basis of an instruction from the control unit 11, the receivers 23 of the opposing station measure the bit error rates (or Q values) of the optical signals at each wavelength. The transmitters 22 of the opposing station are notified of the results. The transmitters 22 of the WDM apparatus 20 as the opposing station which have been notified of the results insert the results in overhead portions of FEC frames used for the optical signals, and transmit the optical signals to the WDM apparatus 10 on the control side. The control unit 11 performs pre-emphasis control on the basis of information on bit error rates or Q values into which the bit error rates are converted. The relationship between the bit error rate (BER) and the Q value is expressed by the following Equation 1 where erfc is a complementary error function.

$$BER = 1/2\{erfc(Q/\sqrt{2})\} \quad (1)$$

FIGS. 4A to 4D and FIGS. 5A to 5D illustrate the flow of changes in an optical spectrum in the case in which the relationship between the pre-emphasis (PE) value and the Q value is linear in the pre-emphasis automatic control illustrated in FIG. 3. In FIGS. 4A to 4D and FIGS. 5A to 5D, the Q values and the PE values at wavelengths from λ1 to λ7 at which bit error rates, which are transmission characteristics of the opposing apparatus of the system, are acquired. The average value of the system and the average deviation 3 of Q values are obtained. Next, the wavelength λ4 whose deviation from Qall_ave 1 is the largest is determined as the center wavelength λ0 at which control is to be performed. Based on the center wavelength at which control is to be performed, λ3 and λ5 adjacent to λ4 (λ0) are determined as the wavelengths (λ0-1 and λ0+1) at which control is to be performed, and the average Q value Q3_ave 2 of three wavelengths at which control is to be performed is calculated. The average Q value Q3_ave 2 is illustrated by dotted lines. For the wavelengths at which control is to be performed, the light intensity levels are changed using transmitters such that the wavelengths at which control is to be performed are equivalent in level to Q3_ave 2.

FIGS. 6A to 6F illustrate changes in optical spectrum in the case in which the relationship between the PE value and the Q value is nonlinear in the pre-emphasis automatic control illustrated in FIG. 3.

FIGS. 6A to 6F and FIGS. 7G to 7L illustrate the Q values and the PE values at wavelengths from λ1 to λ7 at which bit error rates, which are transmission characteristics of the opposing apparatus of the system, are acquired. First, the average value of the system and the average deviation 3 of Q values are obtained. Next, the wavelength λ4 whose deviation from Qall_ave 1 is the largest is determined as the center wavelength λ0 at which control is to be performed. Based on the center wavelength at which control is to be performed, λ3 and λ5 adjacent to λ4 (λ0) are determined as the wavelengths ($\lambda$0-1 and $\lambda$0+1) at which control is to be performed, and the average Q value (Q3_ave) 2 of three wavelengths at which control is to be performed is calculated. The average Q value Q3_ave 2 is illustrated by dotted lines. For the wavelengths at which control is to be performed, the light intensity levels are changed using transmitters such that the wavelengths at which control is to be performed are equivalent in level to Q3_ave 2. Here, when the FEC bit error rates of the wavelengths at which control is to be performed are measured, the Q value of $\lambda$0 is degraded by a nonlinear phenomenon, and therefore the PE value is returned to the original PE value. Next, regarding the center wavelength at which control is to be performed, the sign-inverted value is set for the value obtained by changing the light intensity level using a transmitter, and regarding the adjacent wavelengths, the same value as the value obtained by changing the same light intensity level using a transmitter is set. The FEC bit error rates of the wavelengths at which control is to be performed are measured, and the process returns to S1 of FIG. 3 if the Q value has been improved.

Adjusting the optical signal power of the center wavelength and the adjacent wavelengths at which control is to be performed allows improvement in transmission characteristics from the degraded state caused by interference between signals adjacent to each other. This enables pre-emphasis control with the improved and/or optimized transmission characteristics even in a system in which there is a larger variety of modulation formats, the transmission speed per wavelength has been increased, and wavelength intervals between signals have been decreased.

Figure 8:
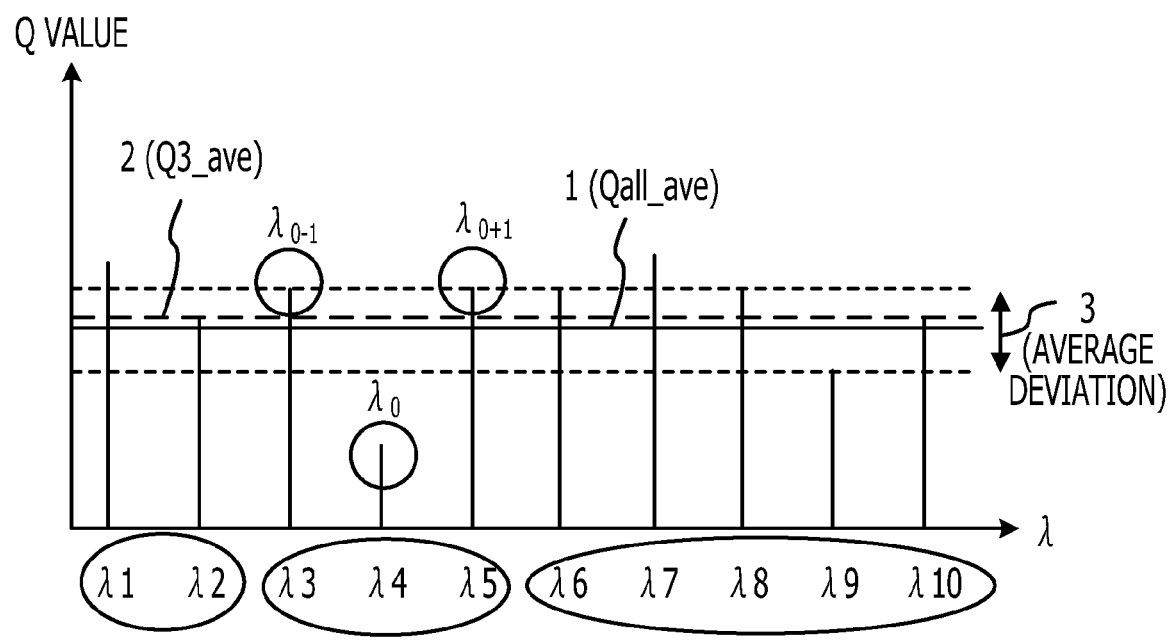
FIG. 8 illustrates a receiver-side optical spectrum.

As a method of controlling the optical power at a wavelength at which control is to be performed and the adjacent wavelengths of at least two different optical signals with optical transmitters or optical receivers that are not dependent on wavelength intervals, the light modulation format, and the client interface, the optimum level difference from the power of the main signal at each transmission speed is controlled by using a level difference table provided in a device or a correction coefficient at each transmission speed for the error rate. FIG. 8 illustrates a receive-side optical spectrum. At a transmission speed of 100 Gbps ($\lambda$1 and $\lambda$2), a transmission speed of 10 Gbps ($\lambda$3, $\lambda$4, and $\lambda$5), and a transmission speed of 40 Gbps ($\lambda$6, $\lambda$7, $\lambda$8, $\lambda$9, and $\lambda$10), transmission at each wavelength is made without depending on the light modulation format.

A correction coefficient is set for the Q value in accordance with the error code correction capability in a WDM apparatus in the case of a transmission speed multiplexing system, so that the transmission optical signal power of at least a wavelength at which control is to be performed and at least two of the adjacent wavelengths at which control is to be performed is controlled independently of wavelength intervals, the optical modulation format, and the transmission speed.

For example, in a WDM apparatus, in the case in which two types (G1 and G2) of different error correction capabilities are present, for the Q value at each wavelength to be used in the calculation of Qave, the Q value of the wavelength of the error correction capability G1 is determined as normal, and a difference between G1 and G2 having a different error correction capability is compensated for. It is given that the wavelength of the error correction capability G1: Q1'=Q1, and the wavelength of the error correction capability G2: Q2'=Q2−(G2−G1).

In a WDM apparatus, in the case of a transmission speed multiplexing system, the optimum level difference from the power of the main signal at each transmission speed and a correction coefficient for the bit error rate are set to the apparatus. This allows the amount of compensation for transmission degradation at each transmission speed to be kept constant.

Figure 9A:
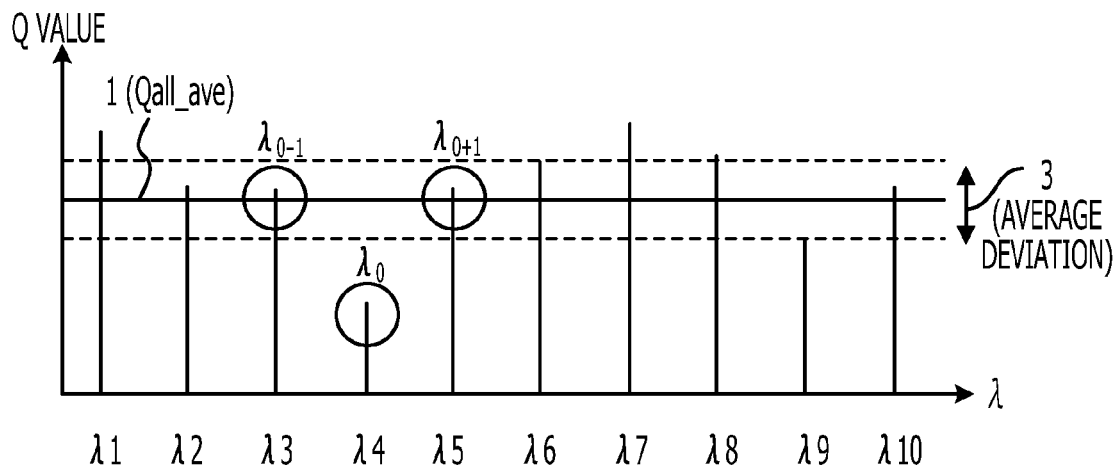
FIGS. 9A to 9C illustrate receiver-side optical spectrum examples of control of transmission characteristics using a combination of the change of the transmitter output level and the amount of dispersion compensation at the transmitter side.
Figure 9B:
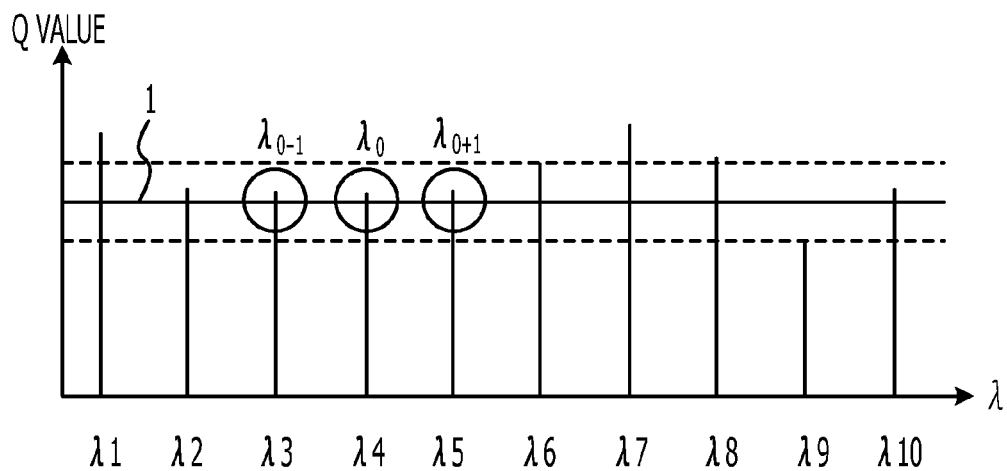
Figure 9C:
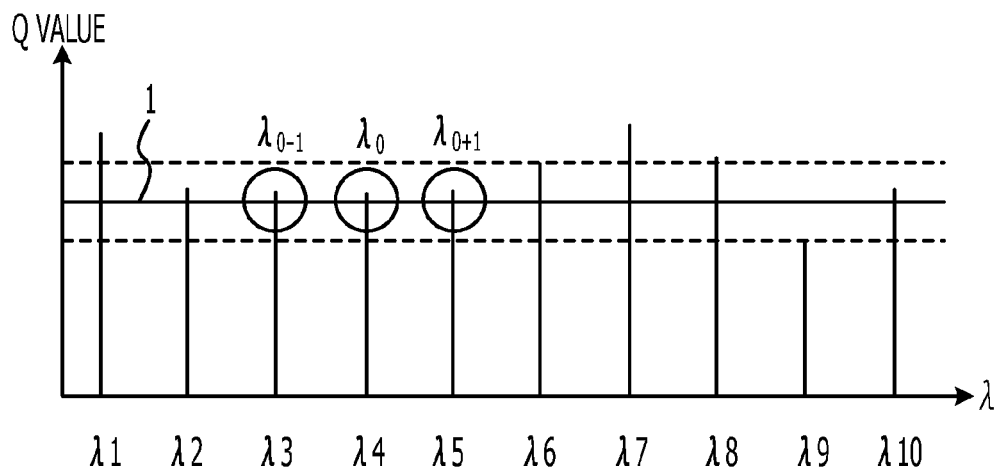

FIGS. 9A, 9B, and 9C illustrate receiver-side optical spectrum examples of control of transmission characteristics using a combination of the change of transmitter output level and the amount of dispersion compensation at the transmitter side. Control is performed such that, after the change of the transmitter output level, automatic dispersion compensation starts for a variable dispersion compensator at the side of the transmitter control WDM apparatus.

A combination method is used in which, for the center wavelength and at least two wavelengths of the adjacent wavelengths at which control is to be performed, the bit error rates are monitored and a combination of automatic control of the amount of dispersion compensation at the transmitter side is used so that optimization may be achieved.

To solve the above-described problems for the conventional pre-emphasis control, after control of pre-emphasis of each wavelength at which control is to be performed, adjustment is made in such a manner that the wavelength dispersion value is changed using a variable dispersion compensator on the transmitter side, and, as a result, the bit error rate may be reduced and/or minimized. The flowchart including wavelength dispersion compensation at the transmitter side is illustrated in FIG. 10.

A processor that is operative to control the transmitters, calculating an average value of transmission characteristics based on transmission characteristics of a plurality of light beams received by a receiver, and determining that, among signals of the plurality of light beams, a wavelength with a deviation from the average value is a wavelength at which control is to be performed, determining that the wavelength at which control is to be performed and a wavelength adjacent thereto are a group of wavelengths at which control is to be performed, obtaining an average of transmission characteristics of the group of wavelengths at which control is to be performed; and based on a difference between averaged transmission characteristics and respective transmission characteristics of the group of wavelengths at which control is to be performed, changing a light intensity output from each transmitter that transmits a group of wavelengths at which control is to be performed. The processor may be a CPU, a FPGA, or circuit.

Figure 10:
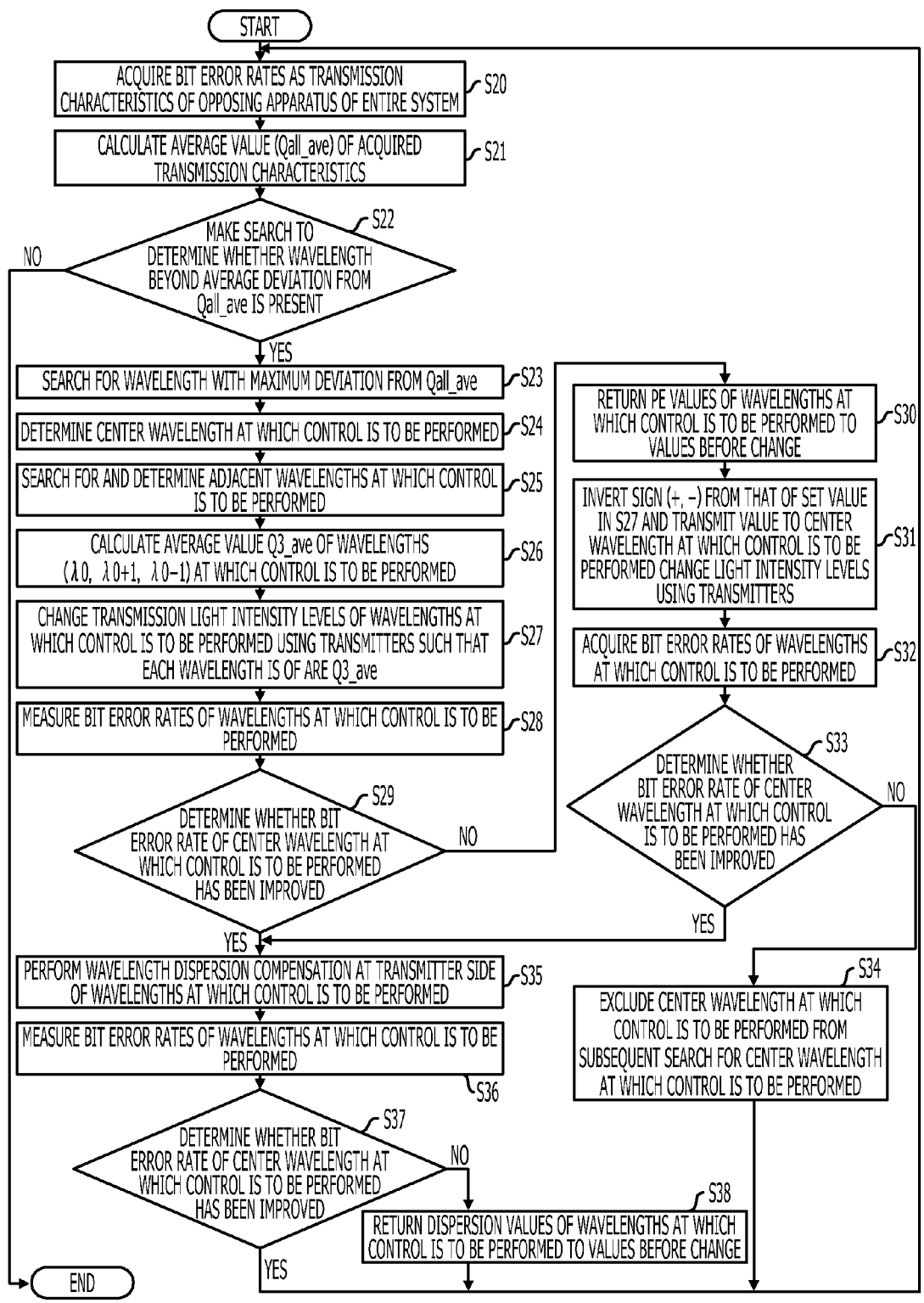
FIG. 10 illustrates a flowchart including wavelength dispersion compensation at the transmitter side.

An example embodiment is illustrated in FIG. 10.

The bit error rates (or the numbers of FEC error corrections), which are characteristics after transmission of the system, are acquired by transmitters or receivers (S20). The average value (Qall_ave 1) of the acquired transmission characteristics is calculated (S21). A search is made to determine whether a wavelength that is outside a region represented by the average deviation 3 from Qall_ave 1 is present. If the wavelength that is outside the region represented by the average deviation 3 from Qall_ave 1 is not present, then the process is terminated (S22). A search is made for a wavelength with the maximum deviation from Qall_ave 1 (S23), and the wavelength is determined as a center wavelength ($\lambda$0) at which control is to be performed (S24). A search is made for adjacent wavelengths at which control is to be performed, which are adjacent (long wavelength/short wavelength) to and placed at regular intervals from the wavelength $\lambda$0 serving as the center, and the adjacent wavelengths $\lambda$0+1 and $\lambda$0-1 at which control is to be performed are determined (S25).

Then the average value (Q3_ave) 2 of transmission characteristics of three wavelengths $\lambda$0, $\lambda$0+1, and $\lambda$0-1 at which control is to be performed is calculated (S26). Next, for three wavelengths at which control is to be performed, the transmission light intensity level (pre-emphasis: PE) of each wavelength is changed using a transmitter such that each wavelength is of Q3_ave 2 (S27). The bit error rates of three wavelengths at which control is to be performed are reacquired or measured (S28). It is determined whether the reacquired bit error rate has been improved (S29).

If the reacquired bit error rate has been improved, then the process goes to S35. If the reacquired bit error rate has not been improved, then (the PE values are returned to the original ones) and the following procedure is performed (S30).

For the center wavelength at which control is to be performed, the transmission light intensity level whose sign is opposite to that of S27 is set using a transmitter. For the adjacent wavelengths at which control is to be performed, the same value as in S27 is set (S31). The bit error rates of the wavelengths at which control is to be performed are measured (S32). It is determined whether the bit error rate of the center wavelength at which control is to be performed has been improved (S33). If the bit error rate has been improved, then the process goes to S35. If the bit error rate has not been improved, then the PE value is returned to the original PE value and, in the subsequent repeat processing, the center wavelength at which control is to be performed is removed from the conditions of search for a center wavelength at which control is to be performed (S34).

The amount of dispersion compensation at the transmitter side is set for three wavelengths at which control is to be performed (S35). The bit error rates of three wavelengths at which control is to be performed are reacquired (S36). It is determined whether the bit error rate of the center wavelength at which control is to be performed has been improved (S37). If the bit error rate has not been improved, then the dispersion value is returned to the original one (S38).

Figure 11:
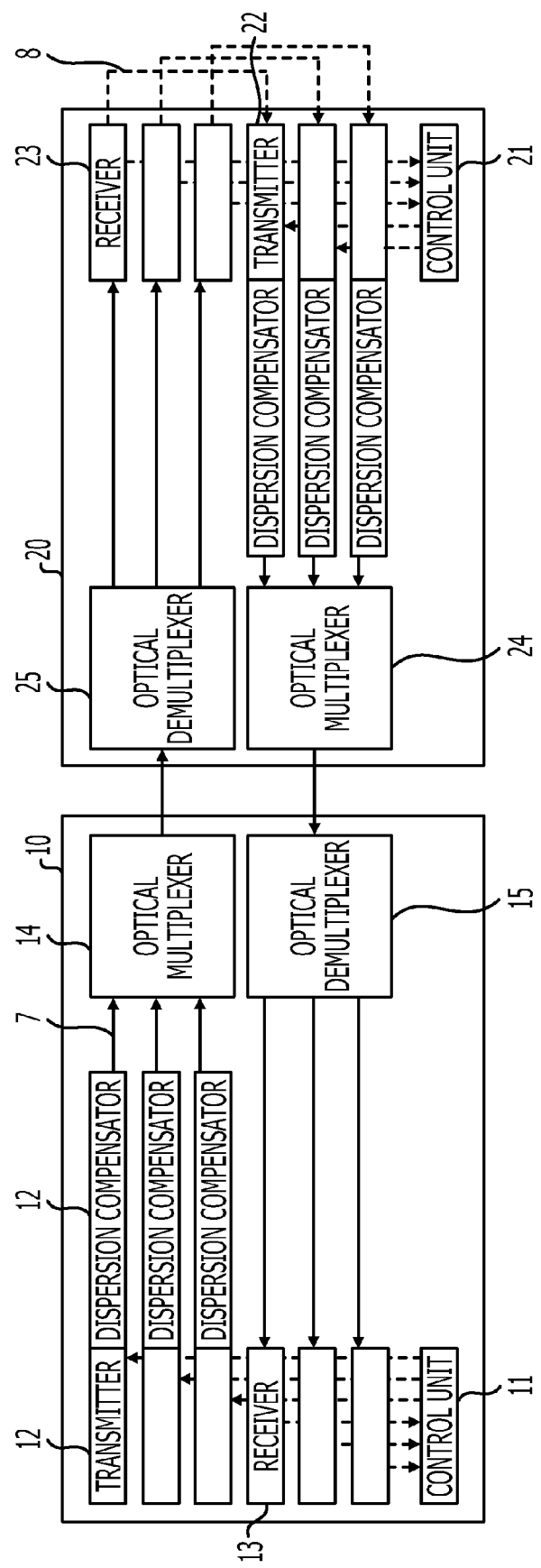
FIG. 11 illustrates a transmission apparatus including transmitter-side wavelength dispersion compensators.

FIG. 11 illustrates a transmission apparatus including transmitter-side wavelength dispersion compensators. The WDM apparatus 10 on the transmitter side includes dispersion compensators 14, and the WDM apparatus 20 as the opposing station includes dispersion compensators 24 in the transmitters 22.

In order to improve and/or optimize the bit error rates, which are transmission characteristics, the light output levels of transmitters are changed. Due to status changes of transmitters and ASE characteristics changes of optical amplifiers, changes of wavelengths of optical signals occur, which affects the wavelength dispersion, and therefore deviation of bit error rates from their optimum values may arise. To reduce and/or eliminate the deviation of transmission characteristics from the optimum values due to the wavelength dispersion, automatic control of dispersion compensation at the transmitter side is performed while monitoring the bit error rates so as to bring about improvement and/or optimization of the bit error rates.

Figure 12:
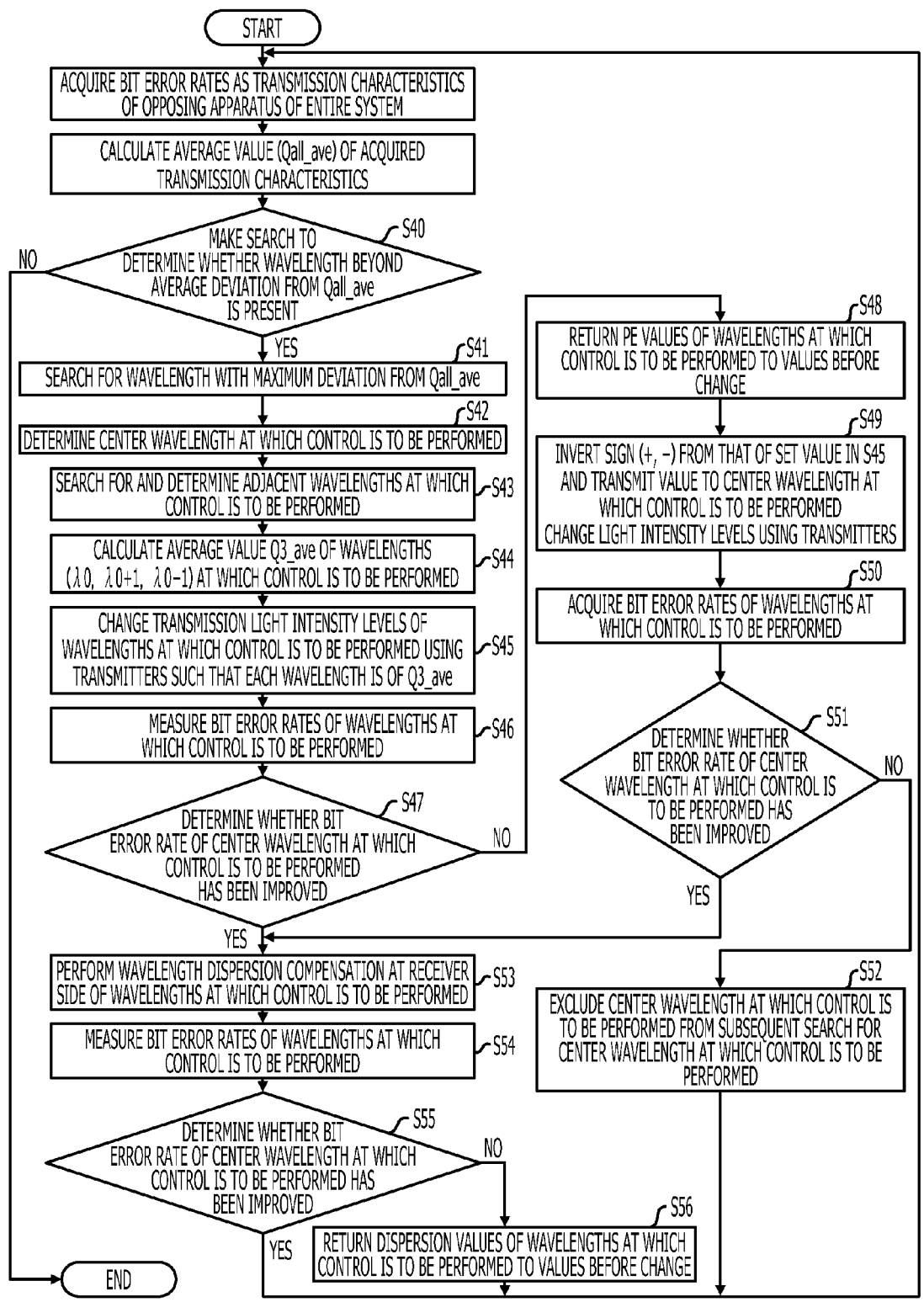
FIG. 12 illustrates a flowchart representing control of transmission characteristics using a combination of the change of the transmitter output level and the amount of dispersion compensation at the receiver side.

FIG. 12 illustrates control of transmission characteristics using a combination of the change of the transmitter output level and the amount of dispersion compensation at the receiver side.

The transmitter output levels are changed, and then control to start automatic dispersion compensation of variable dispersion compensators on the side of the WDM apparatus as the opposing station is performed. A combination method is used in which, for the center wavelength at which control is to be performed and at least two of the adjacent wavelengths at which control is to be performed, the bit error rates are monitored and a combination of automatic control of the amount of dispersion compensation at the receiver side is used so that optimization may be achieved. After control of pre-emphasis of each wavelength at which control is to be performed, adjustment is made in such a manner that the wavelength dispersion value is changed using a variable dispersion compensator on the transmitter side, and, as a result, the bit error rate may be minimized. The flowchart including wavelength dispersion compensation at the receiver side is illustrated in FIG. 12.

The bit error rates (or the numbers of FEC error corrections), which are characteristics after transmission of the system, are acquired by transmitters or receivers (S38). The average value (Qall_ave 1) of the acquired transmission characteristics is calculated (S39). A search is made to determine whether a wavelength that is outside a region represented by the average deviation 3 from Qall_ave 1 is present (S40). If the wavelength that is outside the region represented by the average deviation 3 from Qall_ave 1 is not present, then the process is terminated.

A search is made for a wavelength with the maximum deviation from Qall_ave 1 (S41). The wavelength is determined as a center wavelength (λ0) at which control is to be performed (S42). A search is made for adjacent wavelengths at which control is to be performed, which are adjacent (long wavelength/short wavelength) to and placed at regular intervals from the wavelength λ0 serving as the center, and the adjacent wavelengths at which control is to be performed are determined (S43).

Then the average value (Q3_ave) 2 of transmission characteristics of three wavelengths λ0, λ0+1, and λ0-1 at which control is to be performed is calculated (S44). Next, for three wavelengths at which control is to be performed, the transmission light intensity level (pre-emphasis: PE) of each wavelength is changed using a transmitter such that each wavelength is of Q3_ave 2 (S45). The bit error rates of three wavelengths at which control is to be performed are reacquired or measured (S46). It is determined whether the reacquired bit error rate has been improved (S47).

If the reacquired bit error rate has been improved, then the process goes to S53. If the reacquired bit error rate has not been improved, then (the PE values are returned to the original ones) and the following procedure is performed (S48).

For the center wavelength at which control is to be performed, the transmission light intensity level whose sign is opposite to that of S45 is set using a transmitter. For the adjacent wavelengths at which control is to be performed, the same value as that of S45 is set (S49). The bit error rates of the wavelengths at which control is to be performed are measured (S50). It is determined whether the bit error rate of the center wavelength at which control is to be performed has been improved (S51). If the bit error rate has been improved, then the process goes to S58. If the bit error rate has not been improved, then the PE value is returned to the original PE value and, in the subsequent repeat processing, that center wavelength at which control is to be performed is removed from the conditions of search for a center wavelength at which control is to be performed (S52).

Figure 13:
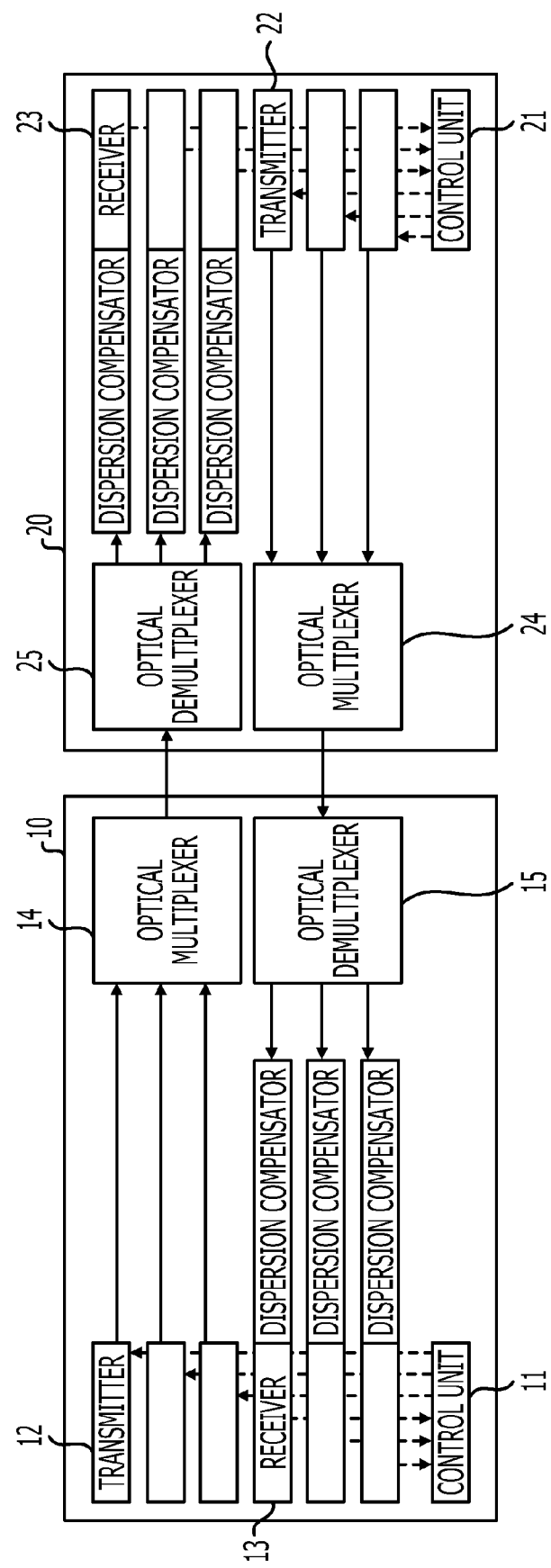
FIG. 13 illustrates a transmission apparatus including wavelength dispersion compensators on the receiver side.

The amount of dispersion compensation at the receiver side is set for three wavelengths at which control is to be performed (S53). The bit error rates of three wavelengths at which control is to be performed are reacquired or measured (S54). It is determined whether the bit error rate of the center wavelength at which control is to be performed has been improved (S55). If the bit error rate has not been improved, then the dispersion value is returned to the original one (S56). FIG. 13 illustrates a transmission apparatus including wavelength dispersion compensators 15 and 25 on the receiver side.

In order to improve and/or optimize the bit error rates, which are transmission characteristics, the light output levels of transmitters are changed. Due to status changes of transmitters and ASE characteristics changes of optical amplifiers, changes of wavelengths of optical signals occur, which affects the wavelength dispersion, and therefore deviation of bit error rates from their optimum values arises. To reduce and/or eliminate the deviation of transmission characteristics from the optimum values due to the wavelength dispersion, automatic control of dispersion compensation at the transmitter side is performed while monitoring the bit error rates so as to bring about improvement and/or optimization of the bit error rates.

Figure 14:
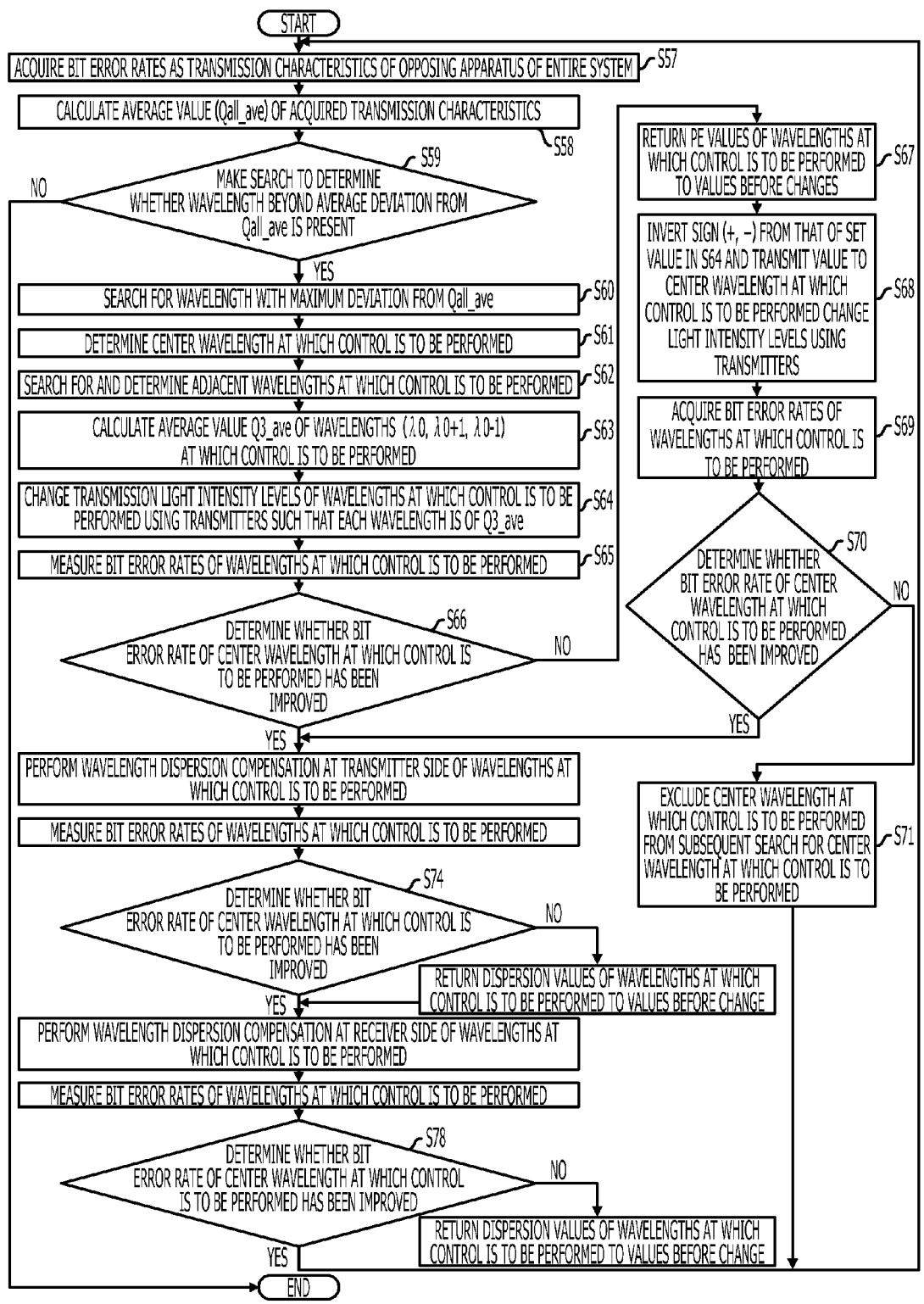
FIG. 14 illustrates a flowchart including wavelength dispersion compensation at the receiver side.

FIG. 14 illustrates control of transmission characteristics using a combination of the change of the transmitter output level and the amount of dispersion compensation at the transmitter side and the amount of dispersion compensation at the receiver side.

After control of the transmitter output levels, control to start automatic dispersion compensation of variable dispersion compensators on the transmitter WDM apparatus side and control to start automatic dispersion compensation of variable dispersion compensators on the side of the WDM apparatus as the opposing station are performed. A combination method is used in which, for the center wavelength and at least two of the adjacent wavelengths at which control is to be performed, the bit error rates are monitored, and a combination of automatic control of the amount of dispersion compensation at the transmitter side and that at the receiver side is used so that optimization may be achieved.

After control of pre-emphasis of each wavelength at which control is to be performed, adjustment is made in such a manner that the wavelength dispersion value is changed using a variable dispersion compensator on the transmitter side, and the wavelength dispersion value is further changed using a variable dispersion compensator on the receiver side, and, as a result, the bit error rate may be minimized. A flowchart including wavelength dispersion compensation at the receiver side is illustrated in FIG. 14.

The bit error rates (or the numbers of FEC error corrections), which are characteristics after transmission of the system, are acquired by transmitters or receivers (S57). The average value (Qall_ave 1) of the acquired transmission characteristics is calculated (S58). A search is made to determine whether a wavelength that is outside a region represented by the average deviation 3 from Qall_ave 1 is present (S59). If the wavelength that is outside the region represented by the average deviation 3 from Qall_ave 1 is not present, then the process is terminated.

A search is made for a wavelength with the maximum deviation from Qall_ave 1 (S60). The wavelength is determined as a center wavelength ($\lambda 0$) at which control is to be performed (S61). A search is made for adjacent wavelengths at which control is to be performed, which are adjacent (long wavelength/short wavelength) to and placed at regular intervals from the wavelength $\lambda 0$ serving as the center, and the adjacent wavelengths at which control is to be performed are determined (S62).

Then the average value (Q3_ave) 2 of transmission characteristics of three wavelengths $\lambda 0$, $\lambda 0+1$, and $\lambda 0-1$ at which control is to be performed is calculated (S63). Next, for three wavelengths at which control is to be performed, the transmission light intensity level (pre-emphasis: PE) of each wavelength is changed using a transmitter such that each wavelength is of Q3_ave 2 (S64). The bit error rates of three wavelengths at which control is to be performed are reacquired or measured (S65). It is determined whether the reacquired bit error rates have been improved (S66). If the reacquired bit error rates have been improved, then the process goes to S77. If the reacquired bit error rates have not been improved, then the PE values are returned to the original ones and the procedure of S67 and the following is performed.

For the center wavelength at which control is to be performed, the transmission light intensity level whose sign is opposite to that of S64 is set using a transmitter. For the adjacent wavelengths at which control is to be performed, the same value as that of S64 is set (S68). The bit error rates of the wavelengths at which control is to be performed are measured (S69). It is determined whether the bit error rate of the center wavelength at which control is to be performed has been improved (S70). If the bit error rate has been improved, then the process goes to S72. If the bit error rate has not been improved, then the PE value is returned to the original PE value and, in the subsequent repeat processing, that center wavelength at which control is to be performed is removed from the conditions of search for a center wavelength at which control is to be performed (S71).

The amount of dispersion compensation at the transmitter side is set for three wavelengths at which control is to be performed (S72). The bit error rates of three wavelengths at which control is to be performed are reacquired or measured (S73). It is determined whether the bit error rate of the center wavelength at which control is to be performed has been improved (S74). If the bit error rate has not been improved, then the dispersion value is returned to the original one (S75). The amount of dispersion compensation at the receiver side is set for three wavelengths at which control is to be performed (S76). The bit error rates of three wavelengths at which control is to be performed are reacquired or measured (S77). It is determined whether the bit error rate of the center wavelength at which control is to be performed has been improved (S78). If the bit error rate has not been improved, then the dispersion value is returned to the original one (S79).

In order to improved and/or optimize the bit error rates, which are transmission characteristics, the light output levels of transmitters are changed. Due to status changes of transmitters and ASE characteristics changes of optical amplifiers, changes of wavelengths of optical signals occur, which affects the wavelength dispersion, and therefore deviation of bit error rates from their optimum values may arise. To reduce and/or eliminate the deviation of transmission characteristics from the optimum values due to the wavelength dispersion, automatic control of dispersion compensation at the transmitter side and dispersion compensation at the receiver side is performed while monitoring the bit error rates so as to bring about improvement and/or optimization of the bit error rates.

Figure 15:
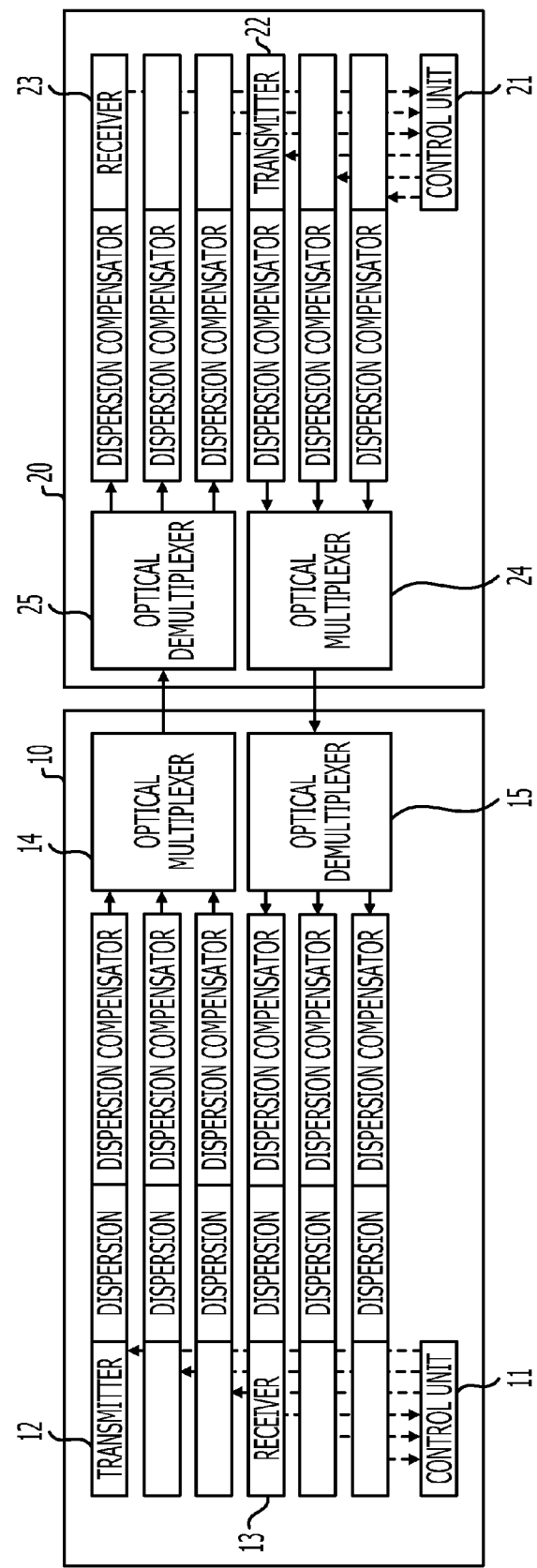
FIG. 15 illustrates a transmission apparatus including wavelength dispersion compensators both on the transmitter side and on the receiver side.

FIG. 15 illustrates a transmission apparatus including wavelength dispersion compensators 15 and 25 both on the transmitter side and on the receiver side.

Figure 16:
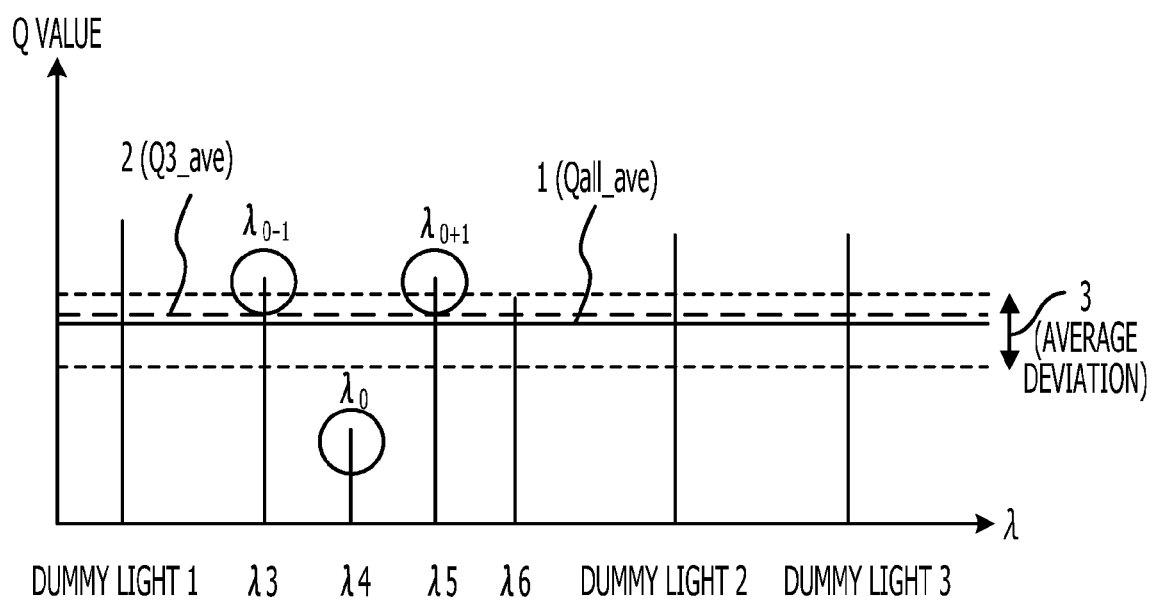
FIG. 16 illustrates an optical spectrum in a transmission system with a small number of wavelengths.

FIG. 16 illustrates an optical spectrum in a transmission system with a small number of wavelengths. Regarding a transmission system with a small number of wavelengths, in the case in which a light source (dummy light) without signal information for balancing gain deviation of an ASE light source is mounted on a WDM apparatus, a table of an optimum level difference between the signal power of dummy light and the power of the main signal is set to the apparatus. At the time of adding a wavelength, the light output of a transmitter corresponding to dummy light needs only to be controlled, making it unnecessary to adjust the existing wavelength.

In a transmission system with a small number of wavelengths and an optical communications system with a long transmission distance, the use of dummy light (DL) in a control-side WDM apparatus allows the output level of the control-side WDM apparatus to be kept constant. The use of a level difference table between the dummy light and the optical signal allows the level difference between the dummy light and the optical signal to be kept constant. Equation 2 for calculating the level difference between the dummy light and the optical signal is given below.

The level difference between the dummy light and the optical signal=(the MAX number of signal wavelengths−the number of operation wavelengths)/the number of DLs  (2)

The MAX number of signal wavelengths represents the maximum number of wavelengths for use in a transmission system, and the number of operation wavelengths represents the number of wavelengths operating in a transmission system. The number of DLs represents the number of dummy light beams.

Figure 17:
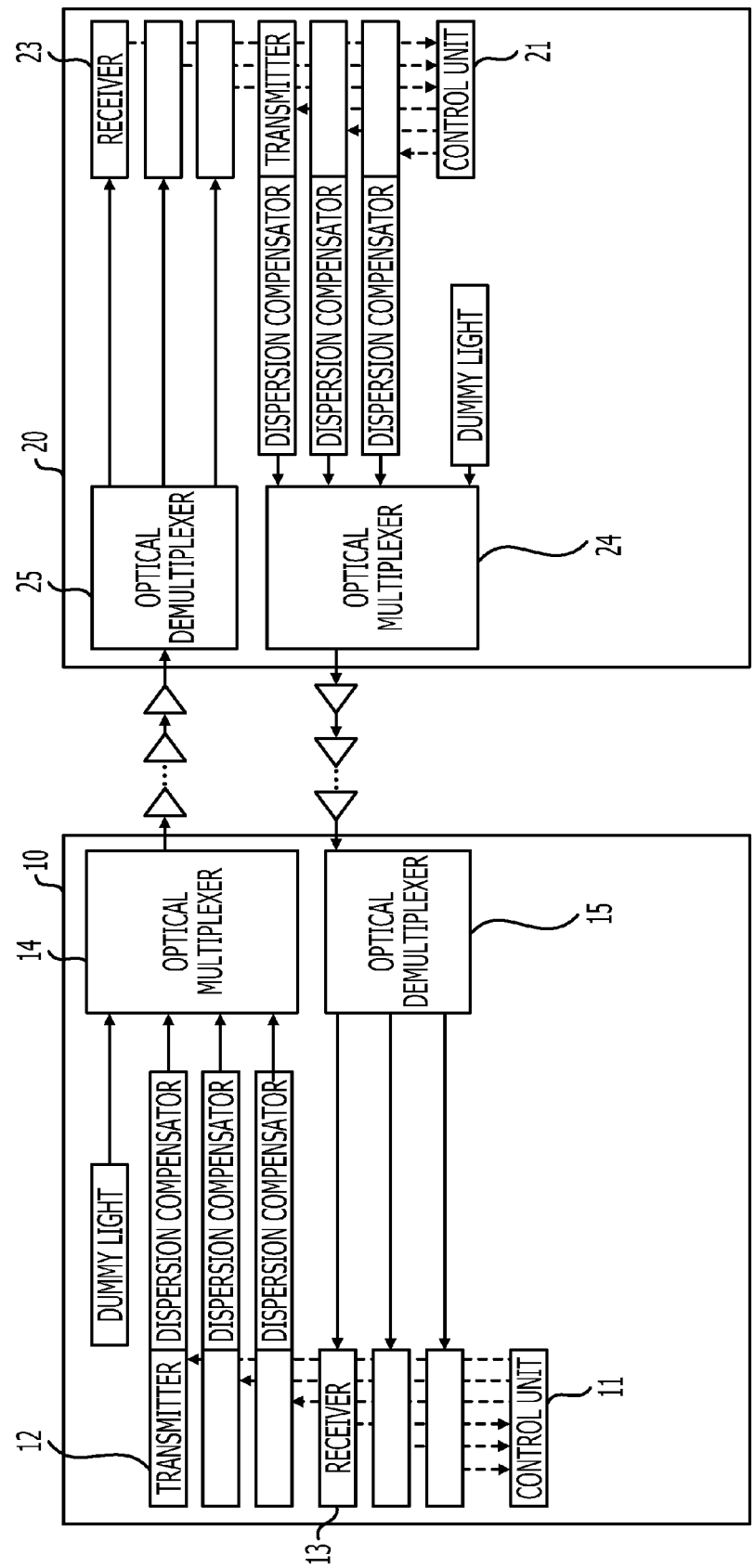
FIG. 17 illustrates a transmission apparatus using optical amplifier repeaters and dummy light.

FIG. 17 illustrates optical amplifier repeaters and dummy light. In a transmission system with a small number of wavelengths, the use of dummy light in a control-side WDM apparatus allows the light output level of a transmitter to be kept constant without changing the light output level from the existing transmitter. At the time of adding a wavelength, the light output of a transmitter corresponding to dummy light needs only to be controlled, making it unnecessary to adjust the existing wavelengths. In a WDM apparatus in the case of a transmission speed multiplexing system, the optimum level difference from the power of the main signal at each transmission speed is set to the apparatus. This allows the amount of compensation for transmission degradation at each transmission speed to be kept constant.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A pre-emphasis control method in a wavelength division multiplexing optical transmission apparatus including transmitters that transmit a light beam toward an opposing station, a receiver that receives a light beam transmitted from the opposing station, and a processor that is operative to control the transmitters, the pre-emphasis control method comprising:

calculating an average value of transmission characteristics based on transmission characteristics of a plurality of light beams received by the receiver, and determining that, among signals of the plurality of light beams, a wavelength with a deviation from the average value is a wavelength at which control is to be performed;

determining that the wavelength at which control is to be performed and wavelengths immediately adjacent thereto are a group of wavelengths at which control is to be performed;

obtaining an average of transmission characteristics of the group of wavelengths at which control is to be performed; and changing a light intensity output from each transmitter that transmits a group of wavelengths at which control is to be performed based on a difference between averaged transmission characteristics and respective transmission characteristics of the group of wavelengths at which control is to be performed.

2. The pre-emphasis control method according to claim 1, further comprising:

calculating an average deviation of transmission characteristics based on the calculated average value of the transmission characteristics of the plurality of light beams received by the receiver, and finishing processing when the transmission characteristics of the plurality of light beams are determined to be within the calculated average deviation.

3. An optical transmission system including a transmitter-side wavelength division multiplexing optical transmission apparatus, the optical transmission system comprising:

a transmitter that transmits a light beam toward an opposing station, a receiver that receives a light beam transmitted from the opposing station, and a processor that is operative to control the transmitter, the receiver, and a control unit that controls the transmitter to perform pre-emphasis control to calculate an average of transmission characteristics based on transmission characteristics of a plurality of light beams received by the receiver, and determine that, among signals of the plurality of light beams, a wavelength with a deviation from the average is a wavelength at which control is to be performed;

to determine that the wavelength at which control is to be performed and wavelengths immediately adjacent thereto are a group of wavelengths at which control is to be performed;

to obtain an average of transmission characteristics of the group of wavelengths at which control is to be performed; and to change, based on a difference between averaged transmission characteristics and transmission characteristics of the group of wavelengths at which control is to be performed, a light intensity output from the transmitter.

* * * * *